United States Patent

Kuo

Patent Number: 5,396,848
Date of Patent: Mar. 14, 1995

[54] REFUSE INCINERATION SYSTEM

[76] Inventor: Tsung-Hsien Kuo, No. 5, Alley 59, Lane 238, Mi-To Road, Chia I City, Taiwan, Prov. of China

[21] Appl. No.: 151,846
[22] Filed: Nov. 15, 1993
[51] Int. Cl.⁶ .......................... F23G 5/00; B09B 3/00
[52] U.S. Cl. ........................ 110/234; 110/224; 110/235
[58] Field of Search ............ 110/234, 235, 346, 224, 110/227, 228

[56] References Cited

U.S. PATENT DOCUMENTS

| | | | |
|---|---|---|---|
| 969,158 | 9/1910 | Diplock | 110/235 |
| 3,926,582 | 12/1975 | Powell et al. | 48/62 |
| 4,030,895 | 6/1977 | Caughey | 48/111 |
| 4,320,709 | 3/1982 | Hladun | 110/235 |
| 4,354,440 | 10/1982 | McRee | 110/346 |
| 4,480,557 | 11/1984 | Hochmuth | 110/234 |
| 4,516,511 | 5/1985 | Kuo | 110/346 |
| 4,599,953 | 7/1986 | Gould | 110/234 |
| 4,724,776 | 2/1988 | Foresto | 110/235 |
| 4,869,181 | 9/1989 | Pike | 110/211 |
| 5,291,840 | 3/1994 | Nakao | 110/235 |
| 5,295,448 | 3/1994 | Vickery | 110/214 |

Primary Examiner—Henry A. Bennett
Assistant Examiner—William C. Doerrler
Attorney, Agent, or Firm—Morton J. Rosenberg; David I. Klein

[57] ABSTRACT

A refuse burning equipment with a heat energy utilizing system includes a first burning room and a second burning room connected with the first one with a burning gas passageway. The first burning room have two tubular fences made of a tube bent into many parallel tubes of horizontal or vertical direction for condensed water to flow through to cool it. Refuse is conveyed through a distributor and pushed down by a screw pusher to be piled in the tubular fences as a thin and high of refuse wall, which then is dried and lowered down gradually by a roller above a furnace grate and then ignited by fuel oil sprayed out of a nozzle. Time for the refuse drying before unload on the grate and chance of refuse to contact with combustion gas are augmented to lower the excess air ratio required in the burning and the temperature of the combustion gas is greatly increased and thus the thermal efficiency improved.

2 Claims, 1 Drawing Sheet

REFUSE INCINERATION SYSTEM

BACKGROUND OF THE INVENTION

It is now a world tide and wave that worldwide material recycling is being increasingly important in the field of waste disposal. Additionally, refuse is a large source of heat energy. High energy recycling processes may be used to increase investment profits from refuse incinerators and further prevents environmental pollution caused by the incinerators during operation.

In a conventional incinerator, the refuse is directly thrown into the incinerator for combustion with a mixture of air flowing under a furnace grate. However in such systems, the refuse is generally wet and combusts slowly due to the fact that it requires a lengthy period of time before the refuse dries and begins to burn. In addition, the combustion gas produced in such burning processes, owing to a required higher incinerator temperature, provides a gas density less than that of the entrance air. In such systems the combustion gas does pass down to the grate once it has risen. Therefore, the oxygen remaining in the combustion gas rarely comes in contact with the refuse again for assisting in the burning process. Thus, the excess air ratio required in the burning process cannot be reduced during operation and the temperature of the combustion gas cannot be increased to any great extent.

The value of the excess air ratio for the burning of various fuels is influenced by the refuse moisture content and ignition temperature and also depends on the total contact surface between fuel and air while burning.

Generally, if the fuel used is highly combustible and has a low moisture content, then a lower amount of excess air ratio is required in the burning process. Additionally, with high contact surface areas between the fuel and air a lower amount of excess air ratio is required. Opposingly, if the fuel has a greater moisture content or there is less contact surface area between fuel and air during combustion then a larger excess air ratio is required.

As an example, with respect to the burning of natural gas, such has little moisture content, is easy to ignite and mixes completely with air during burning, leading to an excess air ratio of only about 1.08. In the burning of coal, although it has a low moisture content and is easy to ignite, due to its compact form the total contact area between the coal and air is less than that of natural gas, and thus the excess air ratio is found to be increased to 1.25. As another example as to the burning of bagasse in a prior art bagasse furnace, although the bagasse is combustible, and its incompact form will greatly increase the total contact surface between the bagasse and air, due to its 45% moisture content, the required excess air ratio is about 1.5. Lately, in the modern bagasse furnaces which are equipped with the spreader stokers, the bagasse shreds are dried while they are spread into the furnace and fall through the combustion gas to burn on the grate. In this case, the excess air ratio has been found to be reduced closer to 1.25.

It has been found that in the incineration of the Taipei municipal combine refuse, in spite of its incompact form the ignition temperature of the combustibles are much like the bagasse, and because of its large percentage of moisture content (about 56%), the excess air ratio requirement increases to 2.0. In the same way, while the wet refuse has been completely dried it is burnt immediately on the grate much in the manner of the bagasse. In this case the excess air ratio is reduced and approaches 1.3, while the combustion temperature is raised.

The higher the combustion temperature, the higher the percentage of energy transformation from steam into mechanical energy and electric energy in an electric generating system operated by steam power. Electrical generation by coal, oil or natural gas is performed by combusting gas temperatures as high as 1540° C. (2800° F). The percentage of transformation from heat energy into electric energy being approximately 40%. But refuse burned in known combusting equipment only produce burned gas having a temperature as low as 850° C., with a transformation percentage being only 20%. Electric energy transformation percentages from the different temperatures of combustion gas via the steam-power cycle may be estimated by an interpolation method.

SUMMARY OF THE INVENTION

This invention is provided to offer improved refuse burning equipment with a heat energy utilizing system.

To attain the object of this invention, the subject system includes a first burning room in which is mounted a tubular gridiron formed of a steel or stainless steel tube horizontally or vertically bent to form two gridirons for storing refuse brought to the first burning room to form a high and low density refuse wall. Condensed water flows through the tubes of the gridiron to cool it while combustion gases rising up from the furnace grate contiguously interface with the gridiron. The refuse stays on the high gridiron for 1 to 2 hours and is gradually lowered to the bottom and moved down by a roller onto the furnace grate and burned thereon.

The refuse reaching the furnace grate is dry, so the excess air ratio needed for burning is about 1.3. At the same time, the cross section of the gridiron may extend in a vertical direction of be inclined so that burned gas produced on the furnace grate by air flowing therein for combustion may rise up along the surface of the refuse wall and then flow down along a burned gas passageway connecting the first burning room with a second burning room and flow into the second burning room. Due to the fact that the first burning room is high, the total surface area of the refuse wall is very large so that burned gas quickly dries up wet refuse while flowing up and down. Additionally, there is 30% surplus air in the burned gas produced in burning process, thus the surplus oxygen impinging on the refuse wall assists the refuse in combustion. The excess air ratio required in this equipment may be as low or less than 1.2 and the temperature of burned gas is raised. Accordingly, the electric generating system using steam power with this system has a higher effectiveness than conventional burning equipment.

DESCRIPTION OF THE PREFERRED EMBODIMENTS

Figure 1:
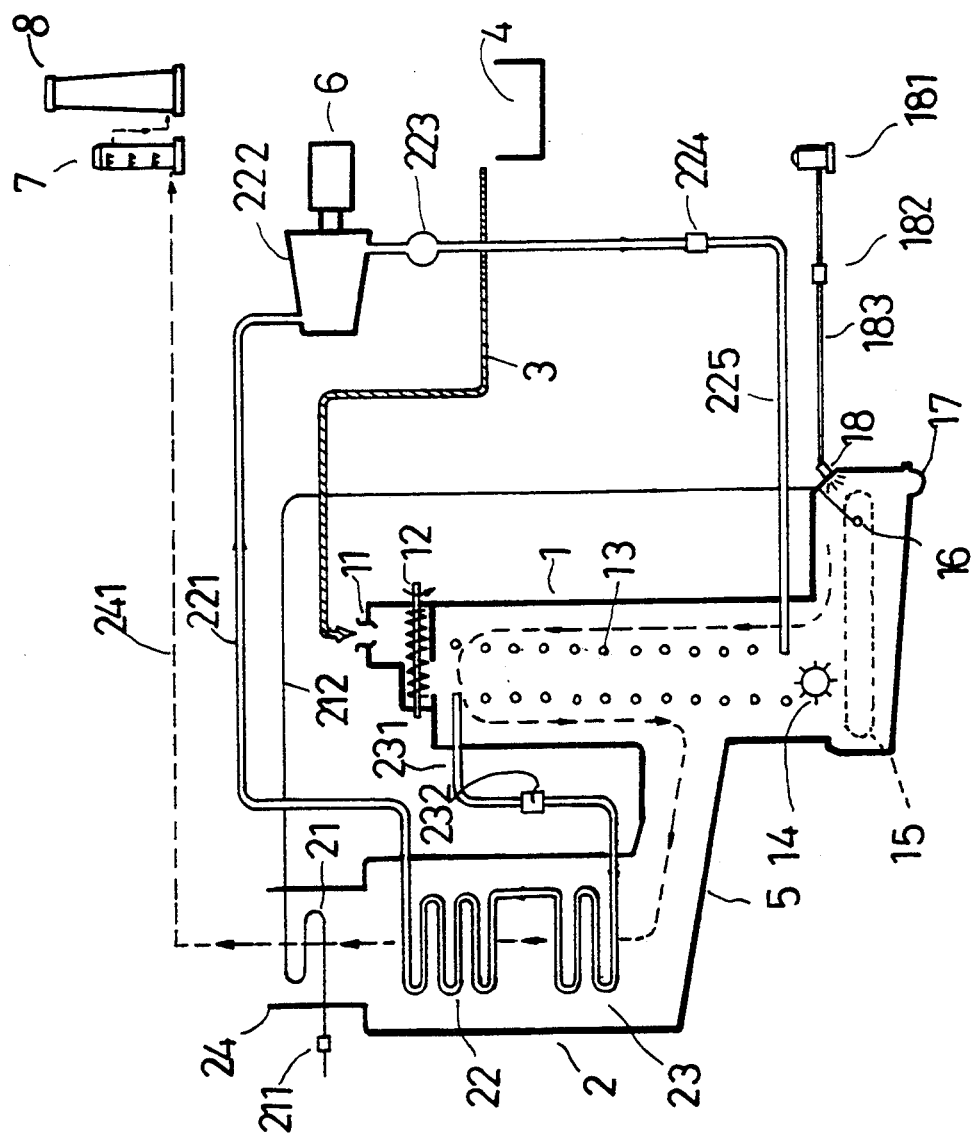
FIG. 1 is a schematic diagram of a refuse burning equipment with a heat energy utilizing system according to the subject invention concept.

A refuse incineration system incorporating a heat energy utilization system is provided in the present invention, as shown in FIG. 1, and includes a first burning room 1, and a second burning room 2.

The first burning room 1 is constructed mostly under the ground and includes a refuse distributor 11 located at a top section to receive refuse conveyed by a conveyor 3 from a refuse storage 4. A plurality of screw pushers 12 are provided and extend horizontally below the distributor 11. Tubular gridiron 13 is provided below the screw pushers 12 and are formed of a hollow steel or stainless steel tube bent in the contour configuration to provide extending parallel tubes of horizontal or vertical position. The tubes may extend vertically or be inclined slightly with respect to the ground. A furnace grate 15 is provided at a bottom section of the room 1, and a refuse roller 14 is provided above the grate 15 and below the gridiron 13 for pulling down the refuse wall stored on the gridiron 13 to the furnace grate 15. An air distributor 16 and a screw conveyor 17 is located in the bottom section of the room 1. A spray nozzle 18 is mounted in a side wall on one side of the furnace grate 15. An oil pump 182 is fluidly connected to an oil tube 183 which is connected to the spray nozzle 18 for supplying fuel from an oil tank 181 which is connected to the pump 182 and the nozzle 18 for spraying oil on the furnace grate to ignite the refuse.

The second burning room 2 is constructed adjacent the first room 1 to allow black smoke with carbon particles generated in the first room 1 to flow therein and remain for a comparatively extended time in order to allow complete combustion. Room 2 is positioned a little higher than the first room 1 with respect to the ground and is connected to the first room 1 through a burning gas passageway 5. The second burning room 2 includes an air preheater 21, a high pressure superheated steam heater 22 connected to a high pressure saturated steam generator 23. The air preheater 21 is connected at one side to a blower 211 and at an opposing side to an air tube 212 connected to the air distributor 16 of the first burning room 1 to form an air transporting route.

The high pressure superheated steam heater 22 is connected to a high pressure steam pipe 221 and a turbine 222. The turbine 222 is coupled to an electric generator 6 and a waste steam condenser 223. The condenser 223 is connected to a condensed water storage 224 which in turn is connected to an outflow tube 225. The outflow tube 225 is coupled to a bottom end of one of the tubes of the gridiron 13 so that condensed water may flow into the tubes of the gridiron 13 for cooling purposes.

An upper end tube of the gridiron 13 is connected to a boiler feedwater tube 231. Tube 231 is coupled to a high pressure water pump 232 and then connected to the high pressure saturated steam generator 23 in the second burning room 2, forming a boiler water supply as well as a steam and heat utilizing route. A flue gas chamber 24 is formed at the back of the second burning room 2 in communication with stack gas passageway 241 connected to a stack gas washing tower 7 and a chimney 8.

In operation, the conveyor 3 is initiated to convey refuse from the refuse storage 4 to the distributor 11 which unloads the refuse evenly into the screw pushers 12. The refuse is pushed down into the gridiron 13 and is filled therein. Condensed water in the condensed water storage 224 flows through the outflow tube 225 into a tube of the gridiron 13. The blower 211 is initiated to transport air through the air preheater 21 and the air pipe 212 to the air distributing tube 16. The oil pump 182 is started to pump fuel through the high pressure tube 183, through the spray nozzle 18, and finally into the first burning room 1. Fuel is combusted and continues to burn for about 2 hours and then terminated. At this time, the refuse roller 14 and the furnace grate 15 are rotationally actuated to let refuse fall down from the gridiron 13 on the furnace grate 15 for burning. Ashes falling down through the grate 15 are conveyed by the screw conveyor 17 and moved out of the first burning room 1. The hot combustion gas rises quickly from the furnace grate 15 because of combustion gas low density and comes into contact with the refuse wall accumulated in the gridiron 13 and continues rising to the neighborhood of the screw pushers 12. As the refuse is pushed into the first burning room 1, there is not enough hollow space for the combustion gas to pass through the pushers. After the combustion gas flows up to the top of the refuse wall in the gridiron 13 and across it, then the combustion gases flow down to pass through the burning gas passageway 5 into the second burning room 2. In the second burning room 2, the combustion gas heats the water in the high pressure saturated steam generator 23 and the high pressure steam in the high pressure superheat steam heater 22. Consequently, the temperature of the combustion gas falls and the gas enters the flue gas chamber 24 and heats the air in the air preheater 21. The temperature of the combustion gas decreases to approximately 280° C. to become stack gas and flows into the stack gas passageway 241 and then into the stack gas washing tower 7 and finally is exhausted from chimney 8.

In regard to utilizing the heat energy, condensed water enters the tube of the gridiron 13 from the outflow tube 225 and cools the gridiron 13, preventing a structural break-up due to the high temperature combustion gas. The water temperature greatly rises after passing through the gridiron 13 and flows through the boiler tube 231, the high pressure boiler pump 232 and into the high pressure saturated steam generator 23 where water is heated to become high pressure saturated steam. This then flows into the high pressure superheated steam heater 22, in which the high pressure saturated steam is heated to become high pressure super-heated steam. The high pressure super-heated steam enters the turbine 222 and rotates the generator 6 which generates electricity. The high pressure super-heated steam inflates and changes into low pressure waste steam to flow out of the turbine 222 into the waste steam condenser 223 in which the low pressure waste steam is cooled into condensed water to be collected in the condensed water storage 224. This is then supplied to the gridiron 13 and to the second burning room 2.

With regard to air transportation, the air is blown into the air preheater 21 by the blower 211 where air is preheated to approximately 200° C. by combustion gas or stack gas and then displaced via the air pipe 212 into the air distributor 16 under the grate 15 where it is evenly supplied to the grate 15. As the grate 15 is hot and the refuse falling thereon is dry, once air flows into the first burning room 1, the refuse on the grate 15 is quickly combusted.

A structural feature of the present invention is the additional provision of the gridiron 13 above the furnace grate 15 in the first burning room 1. This serves as an accumulator for refuse entering the burning room 1 to provide a high and thin wall or column of refuse piled vertically to be dried completely before falling to the grate 15 and being burned, which allows the temperature of burned gas produced by the burning process to be raised quickly which increases the recycled energy. At the same time, even if refuse is very wet, auxiliary fuel is not needed, as shown in examples provided in following paragraphs relating to the present invention in treating refuse.

It is to be understood that the higher the gridiron 13 extends, the higher the refuse wall will be built up in the first burning room 1. Additionally, the drier the refuse is, the higher the temperature of the burned gas produced will be due to the burning of the refuse. Still further, the more inclined the cross section of the tubular fences are to the ground, the more often burned gas will tact with the surface of the refuse wall in its vertical flow path. Thus, oxygen remaining in the burned gas has more chance to assist the burning of the refuse and the temperature of the burned gas will increase.

If the refuse roller 14 for unloading refuse from the refuse wall in the tubular fences 13 on the furnace grate 15 rotates quickly, then the refuse stays in the gridiron 13 for a short period of time and cannot be completely dried, resulting in a lower burning temperature. Opposingly, if the refuse roller 14 rotates slowly, the refuse stays in the gridiron 13 for a longer period of time to enable it to dry, resulting in the burning temperature being increased.

In order to recycle energy, it is important to maximize the electricity produced by a generator and the burning temperature. To produce this effect, the temperature in the first burning room is increased to approximately 1500° C. and the tubes of the gridiron 13 have to be continuously cooled by water flowing through them otherwise the steel tube can be burned badly and structurally damage the gridiron, which reduces the effectiveness of the system. Water flowing through the tubes of the gridiron 13 becomes very hot and is supplied to the boiler to optimize energy for heat.

As an example, the combined refuse in Taipei City in Taiwan, R.O.C., contains a LHV of approximately 1182 Kcal/kg. The make up of the refuse includes plastics 12%, dry plant fiber 17%, water 56%, and nonflammable matter 15%. In using the current system it is found that the temperature of preheated air flowing under the grate approximates 200° C. and the excess air ratio of combustion is lowered to 1.2. The calculated burning temperature approximates 1215° C., and one kilogram of refuse burned produces $CO_2$ in the amount 0.462 Kg; $H_2O$ in the amount 0.695 Kg; $N_2$ in the amount 1.505 Kg; $O_2$ in the amount 0.076 Kg; and HCl in the amount 0.07 Kg. The energy recycled as electricity obtained by steam is about 30.6%. The excess air ratio needed in the burning process is reduced from 2.0 to 1.2, so nitrogen and oxygen contained in the combustion gas is correspondingly reduced and further waste heat carried in the stack gas is also reduced. Opposingly, the net heat in the circulating heated steam is increased.

If the refuse is burned in conventional burning equipment, 7% unburned flammable matter remains in ash and radiation loss of the furnace is approximately 2%. The temperature of the exhaust stack gas is 280° C. and the excess air ratio needed in the burning is 2.0.

In the case of the combined refuse of Taiwan City being burned in a conventional burning equipment, each one kilogram of refuse produces 1,077 Kcal., i.e. LHV $1182 \times (100\% - 7\%) \times (100\% - 2\%)$ with $CO_2$ in the amount 0.430 Kg; $H_2O$ in the amount 0.695 Kg; $N_2$ in the amount 2.508 Kg; $O_2$ in the amount 0.381 Kg; and, HCl in the amount 0.07 Kg. The temperature of stack gas in the stack gas passageway is 280° C., waste heat loss approximate 330 Kcal, and heat loss carried by furnace ash is about 6.8 Kcal. The furnace ash amount is 0.15 Kg, with unburned flammable matter being 0.02 Kg having a specific heat about 0.2 with the temperature of the furnace ash approximating 200° C. Therefore, the calories usable for circulating heated steam for generating electricity is 740 Kcal., i.e. net calorie $= 1077 - 330 - 6.8 = 740$ Kcal. The burned gas has a temperature of 945° C., and the heat effectiveness usable for producing steam-power cycle for generating electricity is about 22.5%. Then each kilogram of refuse burned by the conventional burning equipment produces electric power approximating 0.1936 KWH.

If the combined refuse in Taipei City is burned in the present invention system, flammable matter is not only burned completely but nitrogen and oxygen content is greatly reduced in the stack gas. Each kilogram of refuse burned produces $CO_2$ in the amount 0.695 Kg; $H_2O$ in the amount 0.695 Kg; $N_2$ in the amount 1.505 Kg; $O_2$ in the amount 0.076 Kg; and, HCl in the amount 0.07 Kg. Calorie loss carried by the stack gas from the passageway is about 242.6 Kcal., and calorie loss carried by the ash is about 6 Kcal. Thus, each Kilogram of refuse burned produces about 909.8 Kcal. usable for heating circulating steam. The burning temperature produced in the burning process is about 1215° C. and the heat effectiveness for the steam-power cycle produced is about 30.6%. The electric power produced is about 0.324 KWH when the combined refuse in Taipei is burned in the present invention with an increasing electric power reaching approximately 67%.

In case European or American refuse, containing LHV 2340 Kcal., plastics 4%, dry plant fiber 51%, water 25%, nonflammable matter 20%, is burned in the equipment system of the present invention, the combustion gas reaches as high as approximately 1570° C., and the heat energy of the high pressure superheated steam transformed into mechanical and electric energy reaches as high as 40%.

While the preferred embodiments of the invention have been described above, it will be recognized and understood that various modifications may be made therein and the appended claims are intended to cover all such modifications which may fall within the spirit and scope of the invention.

What is claimed is:

1. A refuse incineration system comprising:
 (a) a first combustion housing defining a first combustion chamber having an upper and a lower first combustion chamber section;
 (b) a second combustion housing defining a second combustion chamber, said first and second combustion chambers in fluid communication each to the other by a gas passageway, a flue gas chamber formed in said second combustion housing in fluid communication by a stack gas passageway to a wash tower and a chimney;
 (c) refuse distribution means located at said upper section of said first combustion chamber for receiving refuse conveyed from a refuse storage housing on a refuse conveyor;
 (d) a plurality of screw pushers positioned below said refuse distribution means in said first combustion housing for delivering said refuse to said first combustion chamber;

(e) a furnace grate located in said lower section of said first combustion chamber;

(f) a refuse roller located adjacent said furnace grate for displacing said refuse to said furnace grate, said lower section of said first combustion chamber having an air distributor conduit mounted therein for supplying air to said furnace grate, a screw conveyor mounted below said furnace grate for removal of combusted refuse residue from said incineration system, a spray nozzle mounted in a side wall of said first combustion chamber lower section for spraying fuel therein to ignite said refuse on said furnace grate;

(g) an air preheater mounted in an upper section of said second combustion chamber;

(h) a high pressure superheated steam heater located in said second combustion chamber;

(i) a high pressure saturated steam generator having an outlet fluidly coupled to said steam heater within said second combustion chamber, said steam heater fluidly coupled to a turbine external said second combustion chamber, said turbine being coupled to an electric generator and fluidly coupled to a waste steam condenser for insert of condensed water to said lower section of said first combustion chamber; and, (j) a gridiron structure located within said first combustion chamber extending between said lower and upper section of said first combustion chamber, said gridiron structure being formed of a plurality of gridiron tubular members for forming a structure to capture said refuse and form columnar walls of said refuse within said first combustion chamber and direct hot combustion gases upwardly from said lower section to said upper section along a first side of said columnar walls, over an upper end of said columnar walls and then downwardly along a second side of said columnar walls before flowing through said gas passageway, said gridiron tubular members including a through passage coupled on a first end in fluid communication with an inlet of said steam generator and coupled on a second end in fluid communication with the waste steam condenser for (1) transporting said condensed water therebetween, (2) cooling said gridiron structure, and (3) preheating said condensed water.

2. The refuse incinerator system as recited in claim 1 where said gridiron tubular members extend in an inclined manner with respect to a horizontal plane.

* * * * *